United States Patent Office 2,972,890
Patented Feb. 28, 1961

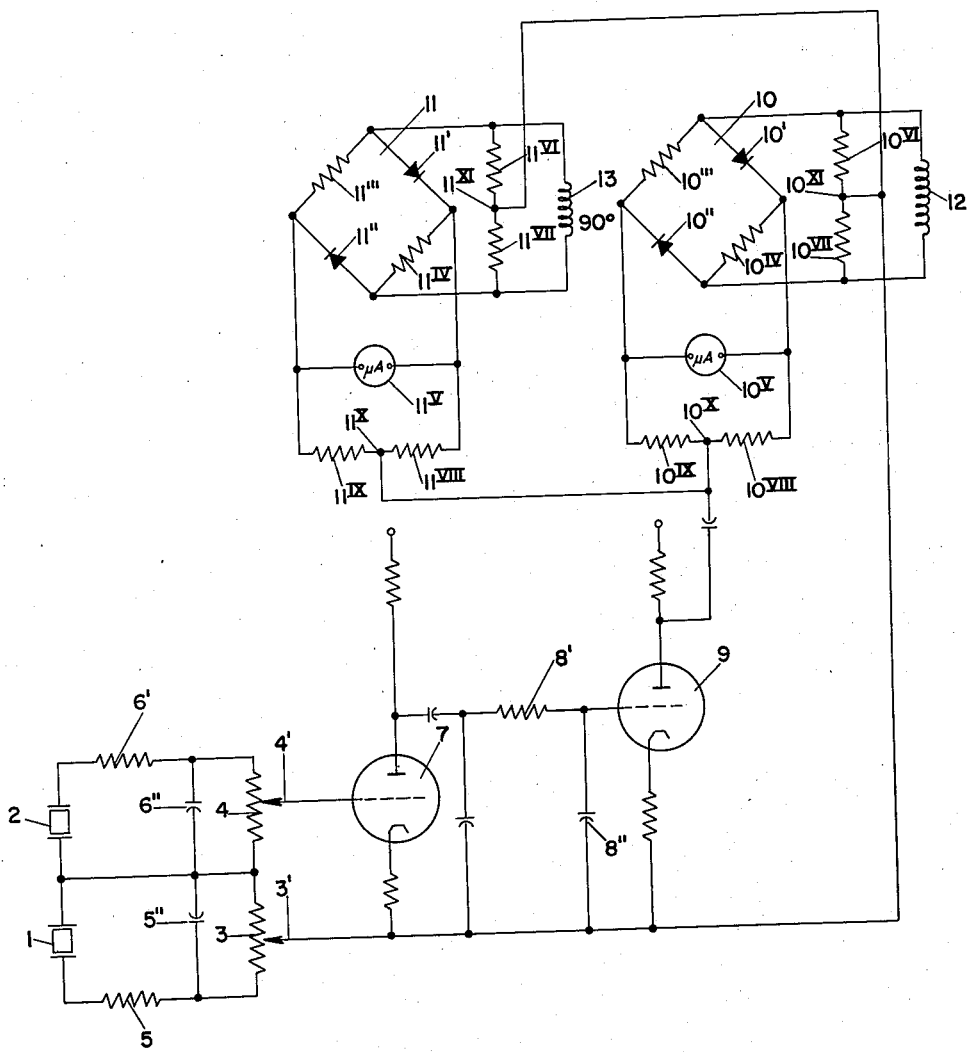

2,972,890
BALANCING MACHINE WITH ELECTRICAL INDICATING DEVICE

Herbert Bergmann, Dusseldorf, and Hermann Josef Backhaus, Mannheim-Friedrichsfeld, Germany, assignors to Firma Losenhausenwerk, Dusseldorfer Machinenbau A.G., Dusseldorf-Grafenberg, Germany Filed Aug. 20, 1956, Ser. No. 614,773

2 Claims. (Cl. 73—462)

This invention relates to a balancing machine with an electrical indicating device. It is common with such machines that alternating-current measuring voltages are produced by means of electro-mechanical transmitters as a function of the out-of-balance force. These alternating measuring voltages are fed to a phase controlled rectifier system that is controlled by an auxiliary alternating current which is synchronous with the revolution of the body to be balanced. An indicating device conncted to the rectifier system is adjusted to zero by means of a phase shift of the auxiliary alternating current, so that the phase position of the out-of-balance force is obtained from the phase adjustment of the auxiliary alternating current. With a phase shift of 90° of the auxiliary alternating current, a maximum deflection of the indicating instrument is obtained which corresponds to the magnitude of the out-of-balance force. This known principle of the electrical out-of-balance force indication has up to now been realized by means of a so-called annular modulator. An annular modulator of this kind is comprised of four rectifiers that are connected in clockwise direction in the four arms of a Wheatstone bridge. The auxiliary alternating voltage is applied to two diagonal points of this bridge, while the indicating instrument is connected to the other diagonal points. Resistors are in circuit with the two diagonals of the bridge and the measuring alternating-current voltage exists between the electric centers of these resistors.

Such an annular modulator has the advantage that a filtering effect is obtained in that the even higher harmonics of the measuring voltage are filtered out. However, four rectifiers are necessary for such an annular modulator, thus causing a considerable expenditure and makes the indicating device more expensive. But experience has proved that nevertheless, the filtering effect of such an annular modulator is insufficient to relaize a full elimination of interferring frequencies contained in the measuring voltage. Efforts have therefore been made to increase the filtering effect of such an annnular modulator by producing an appropriate course of the auxiliary voltage.

The invention is based upon the empirically found conception that the interference effects caused by the harmonic vibrations cannot be eliminated if filtering the harmonic vibrations is effected only at the phase controlled rectifier. This is particularly the case if piezo-electric crystals are used as transmitters and balancing potentiometers are provided for the balancing of the residual moments. The higher harmonics of the measuring voltages caused by irregularities of the ball bearings used in the bearing structure for the body to be balanced or which may be due to similar influence are especially noticeable under these circumstances. The amplitudes of these harmonic vibrations may reach several times the amplitude of the fundamental frequency. Interference effects are obviously produced in spite of the filtering effect of the annular modulator, because non-linear intermediates such as amplifying tubes are overexcited by superimposed disturbing voltages.

According to the invention, the interference effects are eliminated by having at least one filter section connected between the transmitters and the last amplifying stage. This can be realized without considerable extra expenditure, because the filtering effect of the annular modulator for even numbered harmonics can be abandoned and therefore the phase controlled rectifier system can be simplified in such a manner that it is only comprised of two rectifiers connected in two opposite arms of the bridge and two resistors in the other arms of the bridge.

In other words, two rectifiers of the known rectifier system are saved and additional filter sections with greater efficiency can be interposed instead of these before the last amplifying stage.

In balancing machines in which the alternating-current measuring voltages used for balancing of the residual moments, i.e. the influence of the unbalance in one balancing plane on the measurement of the unbalance in the other one, are each fed to a balancing potentiometer where partial voltages are tapped, it has been found advisable preferably to connect low-pass filters between the transmitters and the balancing potentiometers. It is advantageous also to provide filter sections between the amplifying stages.

An embodiment of the invention represented by way of a wiring diagram is more fully explained in the following detailed description.

The alternating-current voltages produced by the electro-mechanic transmitters, e.g. piezo-electric crystals 1, 2 are each fed to a voltage divider 3, 4 where for the purpose of balancing the residual moments appropriately chosen partial voltages are tapped and connected in opposition.

One low-pass filter consisting of one resistor 5', 6', and one condenser 5", 6" is provided behind each of the transmitters 1, 2. A portion of the harmonic vibrations is filtered out by these low-pass filters before the alternating-current voltages reach the balancing potentiometers 3, 4. It has been found that with such a high-ohmic resistor system as required by the high internal resistance of the transmitters 1, 2, the above described filtering process is of great importance for a perfect balancing of residual moments.

The measuring voltage tapped between the potentiometer taps 3', 4' is fed to an amplifying stage 7. Further filtering is effected after this amplifying stage 7 by means of a filter section 8', 8". The harmonic vibrations in the measuring voltage are decreased by this filter section 8', 8" in such a manner that the measuring voltage can be fed practically free of harmonic vibrations through a second amplifying stage 9 to the indicating system 10, 11.

The indicating systems 10, 11 are comprised of two parallel connected and phase controlled rectifier systems. These are controlled by two auxiliary alternating-current voltages synchronized with the revolution of the body to be balanced and out of phase by 90° with respect to each other. One direct-current measuring instrument $10^v$ and $11^v$ is connected to each of the two rectifier systems. When the phase of the out-of-balance force is determined, one of the direct-current measuring instruments serves for zero indication while the other is used to indicate the magnitude of the out-of-balance force.

Owing to the filtering of the harmonic vibrations already effected, no annular modulators and no special form of the auxiliary alternating-current voltage is required. An essentially simplified rectifier system is therefore used, this system comprising a bridge with two rectifiers $10^I$, $10^{II}$ or $11^I$, $11^{II}$ connected in the same direction with respect to opposite terminals and two resistors $10^{III}$, $10^{IV}$ or $11^{III}$, $11^{IV}$ respectively.

The auxiliary alternating-current voltages are supplied by a generator that is driven together with the body to be balanced and has two windings 12, 13 angularly displaced relatively to each other by 90 degrees.

The auxiliary voltage is in each case connected to one of the bridge diagonals. The direct-current instrument $10^{V}$, $11^{V}$ is connected in the other bridge diagonal. In addition, two resistors $10^{VI}$ to $10^{IX}$ or $11^{VI}$ to $11^{IX}$ are connected in each of the two bridge diagonals. The electric centers $10^{X}$, $10^{XI}$ or $11^{X}$, $11^{XI}$ are connected to the the measuring voltages.

An indication immune to interference voltages of the position and the magnitude of out-of-balance forces is obtained with the above described system wherein a small number of rectifiers is used.

What is claimed is:

1. A circuit system for balance testing machines including a rectifier system comprising four arms connected in the form of a Wheatstone bridge to provide first and second pairs of opposite terminals, means for impressing on the first pair of terminals an alternating measuring voltage responsive to electromechanical transmitter means of a dynamic balance tester, said means including a low pass filter adapted to relatively reduce the higher harmonics of the measuring voltage, means for impressing on the second pair of terminals an auxiliary alternating voltage in synchronism and predetermined phase relation to the measuring voltage, and a direct current meter connected to measure the measuring current as modified by the rectifier system thus energized, said rectifier system having rectifiers in two opposite arms having the same direction of rectification each with respect to its first terminals connection, and the other arms being resistive arms of substantial equal conductivity for current in both directions.

2. A circuit system for balance testing machines including a rectifier system comprising four arms connected in the form of a Wheatstone bridge to provide first and second pairs of opposite terminals, means for impressing on the first pair of terminals an alternating measuring voltage responsive to electromechanical transmitter means of a dynamic balance tester, said means including a plurality of amplifier sections and a low pass filter between them adapted to relatively reduce the higher harmonics of the measuring voltage, means for impressing on the second pair of terminals an auxiliary alternating voltage in synchronism and predetermined phase relation to the measuring voltage, and a direct current meter connected to measure the measuring current as modified by the rectifier system thus energized, said rectifier system having rectifiers in two opposite arms having the same direction of rectification each with respect to its first terminals connection, and the other arms being resistive arms of substantial equal conductivity for current in both directions.

References Cited in the file of this patent

UNITED STATES PATENTS

| | | |
|---|---|---|
| 1,929,216 | Pfannenmuller | Oct. 3, 1933 |
| 2,243,379 | Johnson | May 27, 1941 |
| 2,297,255 | Schulze-Herringen et al. | Sept. 29, 1942 |
| 2,622,437 | Frank | Dec. 23, 1952 |
| 2,636,381 | Hagg et al. | Aug. 28, 1953 |
| 2,783,648 | Stovall et al. | Mar. 5, 1957 |